United States Patent Office 2,943,447
Patented July 5, 1960

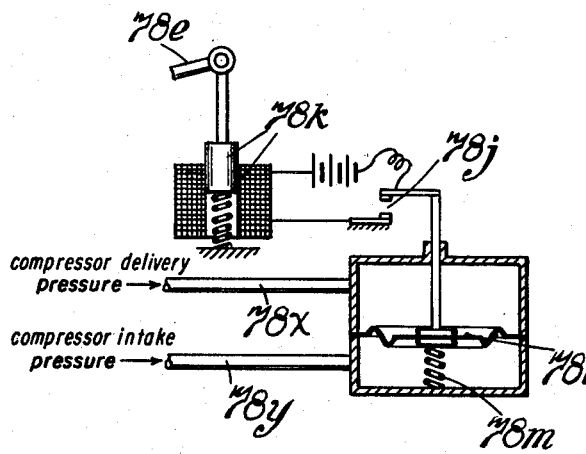
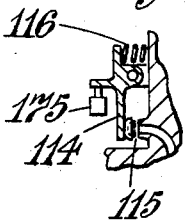
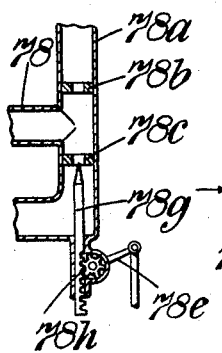
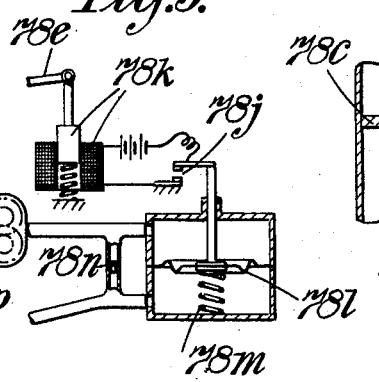

2,943,447

ENGINE ACCELERATION FUEL CONTROL RESPONSIVE TO SPEED SCHEDULED COMPRESSOR PRESSURE RATIO

David Omri Davies, Derby, England, assignor to Rolls-Royce Limited, Derby, England, a British company Filed June 8, 1953, Ser. No. 360,180

Claims priority, application Great Britain June 17, 1952

23 Claims. (Cl. 60—39.28)

This invention relates to fuel systems for gas-turbine engines.

A gas-turbine engine usually comprises a compressor delivering air to combustion equipment in which liquid fuel is burnt with the air and from which the products of combustion pass to a turbine which drives the compressor and may also be employed to drive a power output shaft.

A fuel system for delivering fuel to the combustion equipment of such an engine usually comprises a pump for delivering liquid fuel under pressure to fuel injectors, and a throttle which is arranged to vary the fuel pressure at the fuel injectors and thus to control the rate of fuel flow to the fuel injectors to be dependent upon the setting of the throttle device. In such a fuel system it is usual to provide a basic control mechanism which is operative under steady running conditions to maintain constant the pressure upstream of the throttle or the pressure drop across the throttle, so that thereby for each setting of the throttle the flow through it is maintained constant at a corresponding value. The throttle thus forms the fuel-flow-selecting means by which the value at which the fuel flow is to be maintained by the basic control mechanism in steady running is selected.

With such fuel systems difficulties have arisen when operating under transient engine operating conditions. For instance, when the engine is accelerating, the fuel supply to the engine may be excessive due to the rapidity with which the throttle is opened as compared with the relative slowness with which the engine can accelerate. Such an excess of fuel during acceleration may result in overheating of the combustion equipment and turbine parts and may even result in extinction of the combustion flame if the fuel/air mixture becomes overrich. Furthermore, with some engines over-fueling during acceleration may give rise to surging in the compressor.

When such a fuel system is employed with an aircraft gas-turbine engine, the extent to which over-fueling occurs may be greater at high altitudes due to the reduction in available power which can be developed for accelerating the engine rotor under reduced ambient air density conditions.

In the U.S. Patent No. 2,643,514, A. Jubb (assignor to Rolls-Royce Limited), there is described and claimed a fuel system for a gas-turbine engine in which the above difficulties are avoided or substantially reduced in effect, and the fuel system comprised a fuel pump; fuel injectors connected with the fuel pump to receive fuel under pressure therefrom; basic control means to control the fuel flow from the pump to the fuel injectors at a selected datum for steady running of the engine; fuel-flow-selecting means for selecting the datum value to be maintained by said basic control means in steady running of the engine; and acceleration control means for controlling the fuel flow from the fuel pump to the fuel injectors during acceleration of the engine comprising flow-restricting means located in the pipeline conveying the actual fuel flow to the fuel injectors, the fuel-flow-restricting means having an effective restriction which is not varied directly by adjustment of the datum setting mechanism, and means responsive to a load dependent on the instantaneous pressure drop across the flow-restricting means due to the instantaneous actual fuel flow to the fuel injectors and responsive also to a load dependent on the instantaneous delivery pressure of the engine compressor, said loads acting in opposition, and said load-responsive means being operative to limit the actual fuel flow to the fuel injectors in dependence upon the instantaneous compressor delivery pressure.

Since, under given ambient atmospheric conditions, the compressor delivery pressure is dependent upon the engine rotational speed, by limiting the fuel flow in accordance with the compressor delivery pressure a limiting value of the fuel flow is obtained for each rotational speed of the engine during acceleration.

In one arrangement described in U.S. Patent No. 2,643,514, A. Jubb (assignor to Rolls-Royce Limited), the fuel system has a multi-plunger fuel pump having a swash-plate mechanism for varying the stroke of the plungers and a servo mechanism for adjusting the angle of the swash-plate mechanism. The servo mechanism comprises a piston working in a cylinder under control of pressure fluid delivered directly to one side of the piston and through a restriction to the other side of the piston, and a bleed valve through which pressure fluid is bled off from the latter side of the piston to vary the fluid pressure on that side of the piston and thus to control the position of the piston. In this arrangement, the acceleration control means is arranged to adjust the bleed valve, the load which is dependent upon the compressor delivery pressure being arranged to tend to close the bleed valve, and thus allow the servo mechanism to increase the stroke of the pump plungers, and the load which is dependent on the actual fuel flow to the fuel injectors is arranged to tend to open the bleed valve, and thus to tend to cause the servo mechanism to reduce the stroke of the pump plungers. In this way during acceleration a limiting value of the actual fuel flow is defined for each value of the instantaneous compressor delivery pressure. The bleed valve is for instance carried at the end of a lever and the loads applied to the lever to act in opposition.

This invention comprises improvements in or modifications of the fuel system described and claimed in U.S. Patent No. 2,643,514, A. Jubb (assignor to Rolls-Royce Limited), and according to the present invention in such a fuel system there is provided means to vary the ratio of the instantaneous value of the load produced by the compressor delivery pressure to the corresponding value of the compressor delivery pressure, which means comprises a first conduit leading from the compressor delivery to a point of lower pressure associated with the compressor, first and second restricting means arranged in series in said conduit, adjustable means to vary the ratio of the pressure in said conduit between the first and second restricting means to the compressor delivery pressure, and a second conduit leading from a point in said first conduit between said first and second restricting means to said means responsive to the load dependent on the compressor delivery pressure. On actuation of the adjustable means the said pressure ratio is varied so varying the effect of the compressor delivery pressure on the load-responsive means. By "a point of lower pressure associated with the compressor" is meant atmosphere, or an intermediate stage of the compressor, or the inlet of the compressor whereat the pressure equals the ambient atmospheric pressure as modified by ram effect due to motion through the atmosphere.

In one arrangement, the adjustable means comprises a valve, say a butterfly valve, downstream of the first and second restricting means to control the outflow from the conduit and the valve is adjusted in the sense of closure in accordance with increase of the actual compressor rotational speed, or corrected rotational speed, or the compressor compression ratio which is directly proportional to corrected rotational speed. The adjustment may be a progressive one over a range of speeds or may be substantially instantaneous on attainment of a selected value of the control condition.

In another arrangement, the adjustable means is such that the ratio of the effective restrictions of the first and second restricting means is varied, for instance, by a needle valve co-operating with one of the restricting means, the needle valve being adjustable, say in accordance with change of actual or corrected compressor rotational speed or compressor compression ratio, over a range of the control variable or on attainment of a particular value of the control variable.

In another arrangement, in order to obtain a desired variation in the effect of the compressor deliver pressure on the load-responsive means it is arranged, say by suitably shaping a needle valve co-operating with one of the restricting means to vary its effective area, that, on progressive increase of a control variable such as actual or corrected compressor rotational speed, the effective area increases over part of the range of values of the variable and decreases over another part.

In yet another arrangement, the desired variation in said ratio is obtained by making each restricting means as an orifice and controlling the effective area of one by means of a valve element, such as a half ball, carried on a lever which is rocked by a load which varies in accordance with say corrected rotational speed.

Some arrangements incorporating the invention will now be described with reference to the accompanying drawings in which:

Figure 1 illustrates the invention applied in an acceleration control as described with reference to Figure 4 of U.S. Patent No. 2,643,514, A. Jubb (assignor to Rolls-Royce Limited).

Figure 2 illustrates one modification of part of the arrangement of Figure 1,

Figure 1:
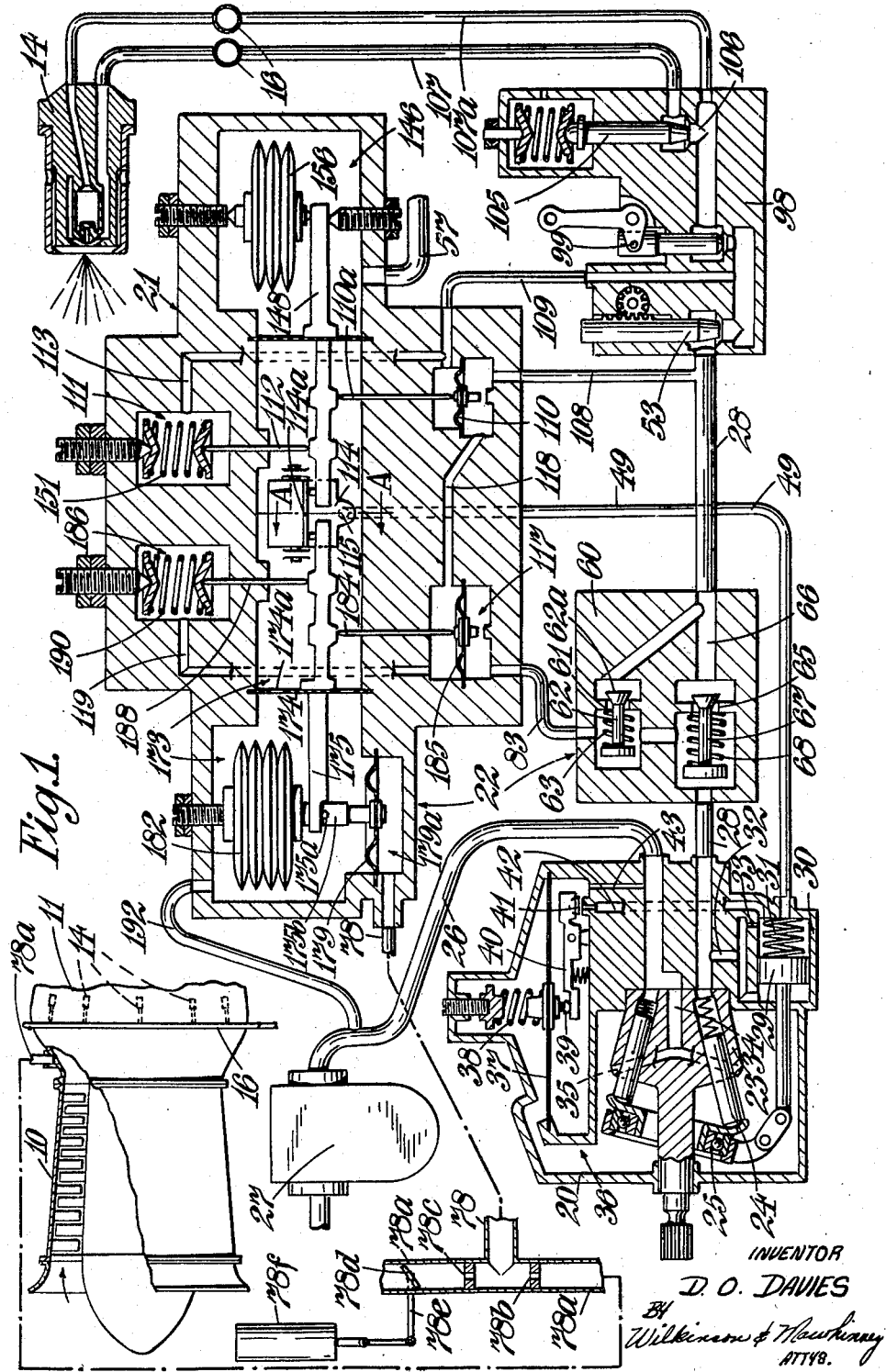
Figure 1A is a view on the line A—A of Figure 1.
Figure 4:
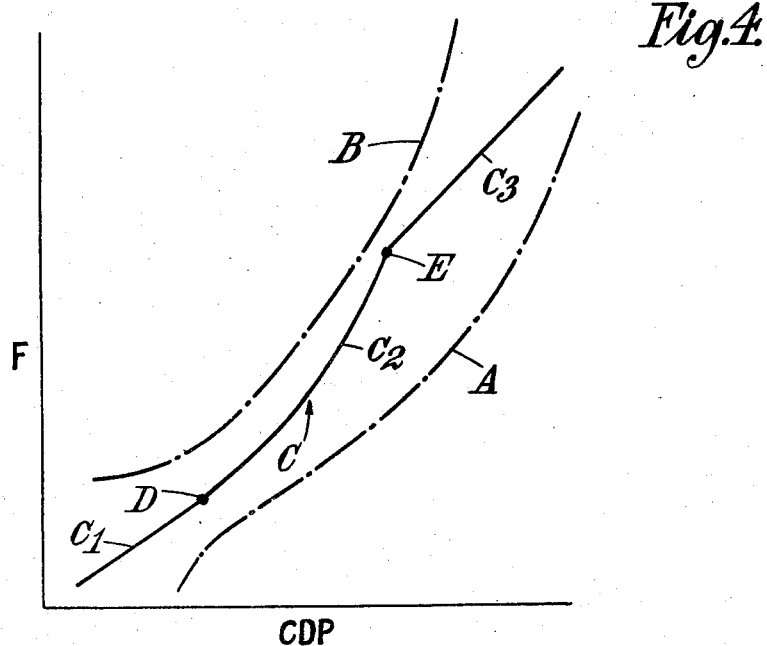
Figure 5:
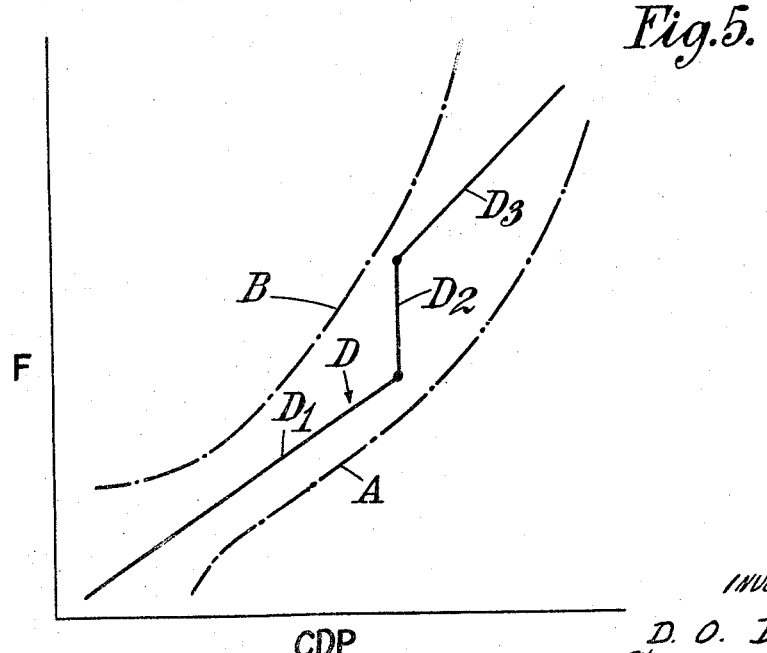
Figure 7:
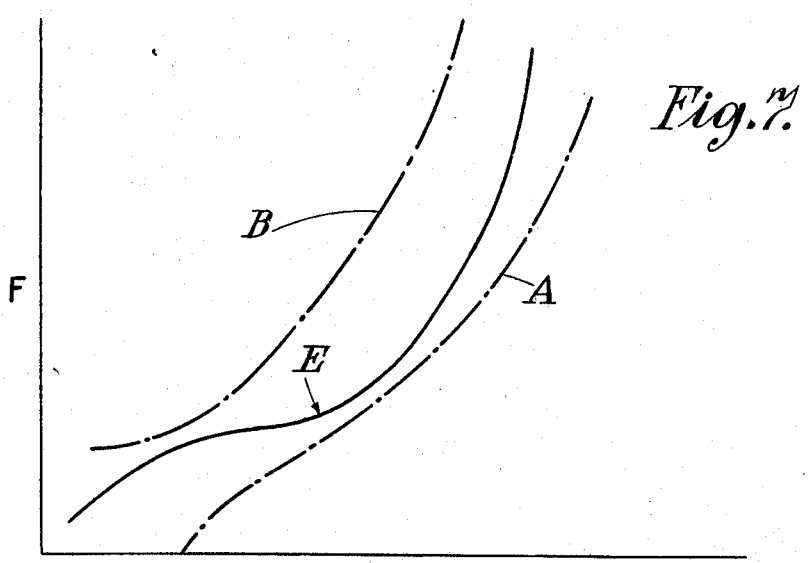
Figure 8:
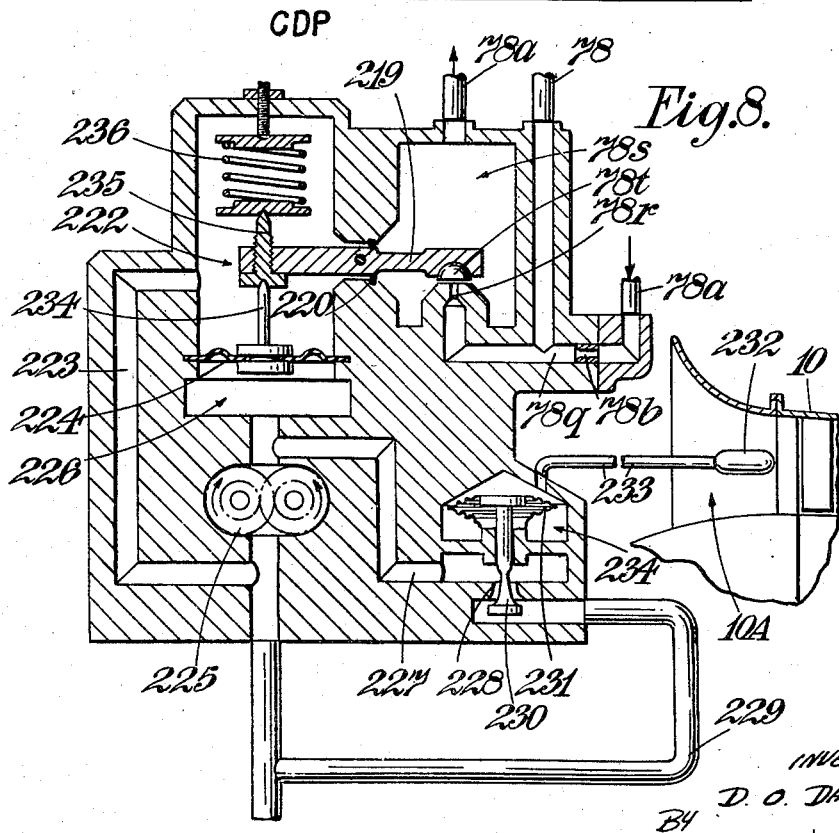

Figure 3 illustrates another modification of part of the arrangement of Figure 1, Figure 3A is a view similar to Figure 3 but showing a pressure ratio control, Figure 4 is a graphical illustration of the effect which can be obtained with the arrangements of Figures 1 and 2, Figure 5 is a graphical illustration of the effect which can be obtained with the arrangement of Figure 3, Figure 6 illustrates another modification, Figure 7 is a graphical illustration of one effect which can be obtained with the modification of Figure 6, and Figure 8 illustrates another modification of part of the arrangement of Figure 1.

The present invention is illustrated in connection with a fuel control, such as is illustrated in Figure 4 of U.S. Patent No. 2,643,514, A. Jubb (assignor to Rolls-Royce Limited), and as reproduced in Figure 1 of the present specification, but it will be understood that the invention is not limited to use with such a fuel control.

Referring to Figure 1, there is illustrated the compressor 10 of a gas-turbine engine and combustion equipment 11 which receives air compressed in the compressor, and fuel through manifold 16 and fuel injectors 14. The combustion products are delivered to a turbine, which is connected to the compressor to drive it.

The fuel system for delivering fuel to the injectors 14 comprises a variable-capacity-type pump which has a pump rotor 23 formed with a number of substantially axial cylinders containing plungers 24, the stroke of which in the cylinders on rotation of the rotor 23 is determined by the angle of inclination of a swash-plate mechanism 25. The fuel is fed to the suction side of the pump through a pipeline 26, and, as is usual, a booster pump 27 is provided to draw fuel from a fuel tank (not shown) and to deliver it to the suction side of the main fuel pump 20. The main fuel pump 20 delivers through a pipeline 28 past various control elements hereinafter to be described to the manifold 16 and fuel injectors 14 of the engine.

The angle of inclination of the swash-plate mechanism 25 is controlled by the position of the piston 29 in a cylinder 30. The piston 29 is loaded by a spring 31 which tends to urge the swash-plate mechanism 25 to a position in which the plungers 24 operate with their full stroke and the piston is arranged to be loaded by fluid pressure on each side thereof. For this purpose the cylinder 30 is connected at each end through a passage 32 to the delivery side of the main fuel pump 20, the supply to the spring-loaded side of the pump passing through a restriction 33. Bleed passages 42, 49 are provided from the spring-loaded side of the piston. In operation, when no fuel is flowing through the bleed passages the fluid pressures acting on the piston 29 are the same and thus owing to the difference in areas on either side of the piston and to the spring the piston moves to a position corresponding to full stroke of the engine. However, when a bleed occurs through one of the bleed passages the fluid pressure acting on the spring-loaded side of piston 29 falls, so that the piston is moved against the action of the spring 31 reducing the stroke of the plungers 24.

The main fuel pump 20 as illustrated comprises a known type of speed governor in which the rotor 23 of the pump acts as a centrifugal impeller. For this purpose the rotor 23 is formed with a central passageway 34 communicating at one end with the suction side of the pump and at its other end with a series of radial passages 35, so that on rotation of the rotor 23 fuel is drawn in through the passage 34 and delivered into the space 36 at an increased pressure dependent on the speed of rotation of the rotor 23 thus loading a diaphragm 37. When the load on the diaphragm 37 reaches a selected value determined by the strength of a tension spring 38 connected with the diaphragm, a tappet 39 carried by the diaphragm engages with a rocking lever 40 to rock it and to open a half-ball valve 41 thereby to allow fluid to be bled from the spring-loaded side of the piston 29 through bleed passage 42. The fluid bled off through the passage 42 returns to the suction side of the main fuel pump 20 through a passage 43.

As is well-known, a gas-turbine engine requires less fuel to maintain a given engine speed under steady running conditions at high altitude than it does at low levels and accordingly the fuel system is provided with known basic atmospheric-pressure-responsive control 21 which is operative at any given atmospheric pressure to maintain the fuel pressure upstream of a throttle 53 at a selected value and to reduce the selected pressure and thus the fuel flow to the engine as the atmospheric pressure decreases so that for a given setting of the throttle the engine speed is maintained substantially constant.

The throttle 53 is provided in the delivery line 28 and the throttle is adjusted to select the basic fuel flow at which in steady running the fuel delivery is to be maintained by the basic control 21.

The throttle is located in a body 98 which has located in it also a shut-off cock 99. In this construction, the body 98 comprises also a pressurising valve 105 which is spring-loaded on to its seat 106 to control the flow of fuel through a main pipeline 107 to the main jet of a double orifice burner of well-known form. During slow running fuel passes only through a pipeline 107a to one of the two orifices of the burner, and when the fuel delivery pressure at the burners 14 increases to a preselected value the valve 105 is lifted off its seat 106 to permit fuel to pass to the other orifices of the burners 14.

The basic control 21 controls the pressure drop across the throttle 53 and for this purpose a pair of branch pipes 108, 109 are connected with the fuel delivery line 28, one on each side of the throttle 53, and are connected at their other ends to a chamber having in it a diaphragm 110, one on each side of the diaphragm. The diaphragm 110 is therefore loaded in accordance with the pressure drop across the throttle 53 and this load is transmitted by a tappet 110a to a lever 148. The chamber 146 is connected to atmospheric pressure through pipe 57, and thus the lever 148 is loaded by a barometric capsule 156 accommodated in a chamber 146, and the lever is also loaded by a spring 151 accommodated in a chamber 111, the load of the spring being transmitted to the lever 148 by a tappet 112. The chamber 111 is connected by a duct 113 to the branch pipe 109 to compensate for the difference in the effective areas of the sides of the diaphragm 110. The lever 148 during steady running conditions controls the outflow of fuel from the spring-loaded side of the piston 29 through bleed pipe 49 by acting on a bleed valve which is illustrated in more detail in Figure 1A.

The bleed valve comprises a rocking lever 114 carrying a half-ball 115 which closes the outlet from the bleed pipe 49, the lever 114 being normally urged by a spring 116 to a position in which the half ball 115 closes the outlet from the bleed pipe 49.

The lever 114 is provided with a shelf-like portion 114a with which a pin carried on the end of the lever 148 engages to rock the lever 114.

It will be seen that the basic control 21 will operate under steady running conditions to maintain a selected pressure drop across the throttle 53, the selected value varying with the atmospheric pressure, and thus to control the fuel flow.

The basic control is however inoperative to control the quantity of fuel passed to the burners during acceleration of the engine, for example if the throttle 53 is opened suddenly, and difficulties can arise in operation due to excessive quantities of fuel being delivered to the engine. For example, if excess fuel is delivered to the engine during acceleration overheating of the combustion equipment and turbine parts may occur with consequent damage to them and also the fuel/air mixture becomes over-rich, which may result in extinction of combustion. Also with certain engines excessive combustion temperatures during acceleration may result in "surging" of the compressor. These difficulties may be overcome by providing an acceleration control 22, which control limits the quantity of fuel which can be delivered to the engine in dependence upon the pressure rise in the compressor of the engine.

The acceleration control 22 shown comprises a valve located in the pipeline 28, the valve comprising a valve body 60, through which the fuel flowing in pipeline 28 passes, a valve seat 61 formed around a port in a passage in the valve body between the inlet and the outlet of the valve body 60 and a valve member 62 which is loaded by a spring 63 to close the port. The shape of the head 62a of the valve member 62 and the rate of the spring 63 are so selected that there is a substantially linear relationship between the pressure drop across the valve and the fuel flow therethrough.

The valve body 60 also comprises a second valve seat 65 surrounding a port in a passage 66 by-passing the valve member 62. The port surrounded by the seat 65 is normally closed by a valve member 67 which is held on the seat 65 by a spring 68. The dimensions of the valve member 67 and the rating of the spring 68 are so selected that, when the pressure drop across the port controlled by the valve member 62 reaches a predetermined value, the valve opens and the pressure drop between the inlet side and the outlet side of the valve body 60 remains substantially constant irrespective of further increase in the fuel flow.

The acceleration control unit also comprises a lever 175 carried on the diaphragm hinge 174 separating two halves of a chamber 173 which are in communication through apertures 174a in the diaphragm.

The lever 175 is arranged to be loaded in accordance with the pressure drop across the valve body 60 by means of a diaphragm 185 contained in a chamber 117, one side of the diaphragm being loaded by the pressure upstream of the valve body 60 through the pipeline 83 and the other side of the diaphragm being loaded by the pressure downstream of the valve body through the branch pipe 108, the chamber on one side of the diaphragm 110 and connecting duct 118. The load is transmitted from the diaphragm 185 to the lever 175 through a tappet 184.

The lever 175 is also loaded by a spring 190 through a tappet 188, the spring being accommodated in a chamber 186 which is connected by a duct 119 to the upper side of the diaphragm 185, this arrangement being adapted to compensate for the difference in the effective areas of the sides of the diaphragm 185.

The lever 175 is also loaded in accordance with the absolute delivery pressure of the compressor by connecting the chamber 179a on one side of a diaphragm 179 through a conduit 78 with the delivery side of the compressor, the diaphragm 179 being connected by a rod 175b with an evacuated capsule 182 and the rod 175b engaging the lever 175 through peg 175a. The chamber 173 is connected by a pipeline 192 to the suction side of the main fuel pump 20, and the effective area of the capsule 182 is selected to be equal to the effective area of the diaphragm 179.

The lever 175 is arranged to engage the shelf-like portion 114a of the lever 114 during acceleration to control the outflow during acceleration from the bleed pipe 49 and thus to over-ride the basic control during acceleration. As will be clear, the loads on the lever 175 due to the spring 190 and the compressor delivery pressure act in a sense to maintain valve 115 closed, and the load on the lever 175 due to the pressure drop across valve body 60 acts in the opposite sense to tend to open the valve 115, and the acceleration control thus acts to limit the maximum fuel delivery at any instant to a value which is dependent on the instantaneous value of the compressor delivery pressure.

It has been found desirable to limit the rate of fuel flow at low rotational speeds during acceleration to a lower value in relation to the instantaneous compressor delivery pressure than at high rotational speeds, because the engine is more sensitive to over-fueling at low rotational speeds, and the present invention therefore provides means whereby the limiting effect of the acceleration control may be modified as the engine accelerates. This modification of the limiting effect may be made gradually over a range of rotational speeds (actual or corrected) or on attainment of a selected rotational speed (actual or corrected).

This is achieved by varying the effect of the compressor delivery pressure on the diaphragm 179 by increasing the load on diaphragm 179 per unit of compressor delivery pressure, the load tending to oppose opening of the bleed valve 115.

In the arrangement illustrated in Figures 1 and 1A the variation is effected over a range of speeds by tapping off air from the delivery of the compressor 10 through a conduit 78a in which are arranged in hydraulic series a pair of flow restrictors 78b, 78c and a valve 78d (illustrated as a butterfly valve) which valve controls a flow of air from the compressor delivery through the conduit 78a to atmosphere, and by connecting a conduit 78 leading from the chamber 179a of which the diaphragm 179 is a wall, to the conduit 78a at a point between the two flow restrictors 78b and 78c.

When the valve 78d is fully open the pressure intermediate the two flow restrictors 78b and 78c (and thus the pressure acting on diaphragm 179) has its minimum value which is substantially less than and proportional to the compressor delivery pressure, and as the valve 78d is closed so the pressure intermediate the two flow restrictors 78b, 78c gradually increases until, when the valve 78d is fully closed, the pressure intermediate the two flow restrictors 78b, 78c will be equal to the compressor delivery pressure. Thus by gradually closing the valve 78d as the engine rotational speed increases through a given range of rotational speeds the effect per unit of pressure of the compressor delivery pressure on the diaphragm 179 is gradually increased. At speeds below the given range the valve 78d is fully open, and at speeds above the given range the valve 78d is fully closed.

The valve 78d may be adjusted in any convenient manner in accordance with engine rotational speed; thus, for instance, the valve may be provided with an operating arm 78e connected to the piston element of a piston and cylinder servo mechanism 78f whereof the piston moves automatically in accordance with engine rotational speed. Servo mechanisms suitable for this purpose are described in U.S. Patent Nos. 2,705,590, 2,651,261 and 2,741,423 to which reference may be made for details of construction and operation of the servo mechanism.

A similar effect can be obtained with the arrangement of Figure 2 in which the valve 78d is replaced by a needle valve element 78g which co-operates with the restrictor 78c to vary its effective restriction. The valve may be adjusted through a rack and pinion mechanism 78h by the operating arm 78e.

One effect which may be obtained by the arrangements of Figures 1 and 1A, and 2 is illustrated in the graph of Figure 4, in which the abscissae are compressor delivery pressure (CDP) and the ordinates are fuel flows (F). Trace A indicates the "steady running" fuel requirements of the engine. Trace B indicates the fuel flow which it is desired not to exceed, i.e. fuel flows above which there is a serious risk of damaging the engine. Trace C indicates the maximum actual fuel delivery as determined by the acceleration control. The part $C_1$ of the trace is a straight line and indicates that, below a selected speed represented by point D, the ratio of the load on diaphragm 179 due to compressor delivery pressure to the instantaneous compressor delivery pressure is constant, the part $C_2$ indicates that between speeds represented by points D and E the ratio is gradually increasing, and the part $C_3$ indicates that above the speed represented by point E, the ratio is again constant. Referring to Figure 1, the valve 78d will be fully open over the part $C_1$ of the trace, will gradually close over part $C_2$, and will be fully closed over part $C_3$.

If it is desired to vary the ratio of the load on the diaphragm 179 due to the compressor delivery pressure to the instantaneous compressor delivery pressure from one value to another at a given rotational speed (actual or corrected) the following arrangement may be employed. Referring to Figure 3, the operating arm 78e may be actuated by a solenoid device 78k, the coil of which is energised under control of switch 78j. The switch is closed by a speed-responsive device on attainment of a given speed. For instance for closure of the switch 78j in accordance with actual rotational speed, the switch may include a movable contact actuated by a diaphragm 78e movable against a spring 78m by being subjected to the pressure drop across an orifice 78n fed with pressure liquid by a fixed-capacity positive displacement pump 78p which is driven at a speed proportional to the compressor rotational speed. When the speed reaches a predetermined value the diaphragm 78e is displaced against the spring 78m sufficiently to close switch 78j thus to energise solenoid device 78k and actuate the operating arm 78e.

The effect obtained with this arrangement is illustrated graphically in Figure 5, in which traces A and B have the same significance as in Figure 4. The trace D indicates the limiting fuel delivery during acceleration and it will be seen that below the change-over speed or compressor delivery pressure (since for given atmospheric conditions the compressor delivery pressure is a unique function of the speed), represented by vertical portion $D_2$ of the trace, the part $D_1$ of trace D is a straight line indicating that the rate of increase of fuel supply with speed (and thus the ratio of the load on diaphragm 179 due to the compressor delivery pressure to the instantaneous compressor delivery pressure) is constant at a first value, and the straight-line part $D_3$ of the trace D indicating that, above the change-over speed or compressor delivery pressure, the rate of change of fuel supply with speed (and thus the ratio) is constant at a higher value.

Figure 3A is similar to Figure 3 except that it shows a pressure ratio control and similar parts have been indicated by the same reference numerals as are used in connection with Figure 3. The only difference between the structure of Figure 3 and Figure 3A is that the pump 78p and the restrictor 78n containing connection between the two pressure connections are omitted. In Figure 3A the upper pipe 78x is connected to the delivery of the compressor and the lower pipe 78y is connected to the intake of the compressor and thus the switch contacts 78j will be brought into engagement at a particular value of the ratio of these two pressures, namely, the compressor delivery pressure and the compressor outlet pressure.

Other effects may be obtained with the arrangement of this invention. For instance, referring to Figure 7, if it is desired to control the fuel delivery during acceleration in the manner represented by trace E, the fuel supply first increasing at a constant rate with change of speed, then gradually increasing at a slower rate and then gradually increasing at an increasing rate, an arrangement such as is shown in Figure 6 may be used. In this arrangement the valve for co-operating with, say, restrictor 78c may have a shaped head so that as the valve is moved upwardly the effective area of the orifice 78c first remains constant, is then gradually increased and is then gradually decreased, so that the ratio of the load on diaphragm 179 due to compressor delivery pressure to the instantaneous compressor delivery pressure remains constant over the first part of the travel of valve 78g then gradually decreases and finally gradually increases.

Referring to Figure 8, there is illustrated one method by which the ratio of the pressure acting on diaphragm 179 can be varied in accordance with the corrected rotational speed of the compressor, the corrected rotational speed being, as is well known, equal to $$\frac{N}{\sqrt{T}}$$

where N is the actual rotational speed and T is the temperature at the intake 10A of the compressor 10.

In this arrangement the conduit 78a leading from the compressor delivery comprises a duct 78q having in it the upstream restrictor 78b and terminating in a restricting orifice 78r leading to a chamber 78s from which the outflow portion of the conduit 78a leads. The conduit 78 is connected to the duct 78q between the two flow restrictors 78b, 78r. The effective area of the orifice 78r is controlled by a half-ball valve element 78t carried by a lever 221 pivoted on a pin 219 in a wall of the chamber 78s. The opposite end of lever 221 projects into a chamber 222 through a sealing ring 220 by which chamber 222 is sealed off from chamber 78s, the chamber 222 having a flexible diaphragm 224 as a wall thereof and having a duct connection 223 to the inlet of a gear pump 225. The delivery of the pump leads to a chamber 226 of which the diaphragm 224 also forms a wall, and to a return duct 227 leading to a port 228 and return duct 229 back to the inlet of the pump 225. The pump 225 is driven at a speed proportional to the compressor speed and thus the flow through duct 227 is directly proportional to the compressor speed, and the pressure drop across the port varies with change of the actual rotational speed (N).

The effective area of the port 228 is controlled by valve element 230 carried by a flexible capsule 231 arranged to expand and contract in accordance with the temperature at the intake 10A of the compressor 10. A bulb 232 is located in the intake and connected by pipe 233 to the chamber 234 containing the capsule, and the bulb, pipe and chamber are filled with a suitable fluid. On increase of the intake temperature, the fluid expands causing the capsule 231 to collapse, thus lowering the valve element 230. The head of the valve element 230 is so shaped that this movement causes an increase in the effective area of the port 228 and thus a decrease in the pressure drop across the port 228. A decrease in intake temperature causes an increase of the pressure drop. By suitable shaping of the head of the valve element 230, the pressure drop across the port is controlled to be a function of the corrected rotational speed $$\frac{N}{\sqrt{T}}$$

The diaphragm 224 is loaded by the pressure drop across port 228, and this loading is communicated to the lever 221 by a tappet 234 which bears on an adjustable abutment 235 carried by the lever 221. A spring 236 loads the lever 221 in opposition to the diaphragm 224, so that the position of diaphragm 224 and of lever 221 is controlled by the pressure drop across port 228, which is a function of the corrected rotational speed, and by the rate of spring 236.

It will be seen that as the corrected rotational speed increases so the half-ball valve element 78t moves to increase the restriction to flow through orifice 78r, and thus to increase the ratio of the pressure in conduit 78 to the delivery pressure of the compressor. Conversely, a decrease in the corrected rotational speed causes a decrease in said ratio. By suitable choice of the limiting loads when valve element 78t is fully open and fully closed, this arrangement may be arranged to have a characteristic similar to that shown in Figure 4.

I claim:
1. For use with a gas-turbine engine which comprises a compressor, main combustion equipment connected to the outlet end of the compressor and a turbine connected to receive combustion gases from the main combustion equipment, a fuel system for delivering fuel to the main combustion equipment comprising a fuel pump, fuel injectors adapted to deliver fuel into the combustion equipment and a pipe-line connecting the fuel pump and the fuel injectors, and control means controlling the fuel flow from the pump through the pipe-line to the injectors during acceleration of the engine, which control means comprises flow-restricting means located in the pipe-line, the actual fuel-flow to the injectors passing through the flow-restricting means whereby a pressure difference which varies with the rate of fuel flow is produced across said flow-restricting means, an adjustable control member adapted on adjustment to vary the rate of fuel flow to the injectors, first pressure-responsive means, pressure connections leading from said pipe-line on each side of said flow-restricting means and connected to said first pressure-responsive means to subject said first pressure-responsive means to a load which varies with said pressure difference, said first pressure-responsive means being connected to load said adjustable control member to adjust it in the sense to reduce the fuel flow in the pipe-line as said pressure difference increases, second pressure-responsive means, a first conduit adapted to lead from the delivery end of said compressor to a point of lower pressure associated with the compressor, first and second restricting means arranged in series in said first conduit, a second conduit connected to said first conduit between said first and second restricting means and connected to said second pressure-responsive device to load it in accordance with the pressure produced in said first conduit between said first and second restricting means by the compressor delivery pressure, said second pressure-responsive means being connected to said adjustable control member to adjust it in the sense of increasing the fuel flow in the pipe-line as the compressor delivery pressure increases, adjustable means controlling flow of air in said first conduit from the compressor delivery through said first and second restricting means to the point of lower pressure thereby on adjustment to vary the pressure in the first conduit between the first and second restricting means and the ratio of the pressure acting on the second pressure-responsive means to the instantaneous compressor delivery pressure to modify the control effect of compressor delivery pressure, and engine-parameter-responsive means responsive to an engine operating parameter which varies with engine rotational speed throughout the speed range thereof, said engine parameter-responsive means being connected to adjust the adjustable means in a sense to increase said ratio as the engine accelerates from a lower to a higher speed at least in a range of speeds between a low speed range and a high speed range.

2. A fuel system as claimed in claim 1, wherein the adjustable means comprises a valve located in said first conduit downstream of the first and second restricting means to control the outflow from the conduit.

3. A fuel system as claimed in claim 2, wherein the valve is a butterfly valve.

4. A fuel system as claimed in claim 1, wherein said first and second restricting means are in the form of fixed-area orifices, and wherein the adjustable means comprises a valve located in said first conduit downstream of said first and second restricting means to control the outflow from the conduit.

5. A fuel system as claimed in claim 4, wherein the valve is a butterfly valve.

6. A fuel system as claimed in claim 1, wherein the adjustable means is such that the ratio of the effective restrictions of the first and second restricting means is varied by adjustment of said adjustable means.

7. A fuel system as claimed in claim 6, wherein the adjustable means comprises a valve element co-operating with an orifice affording one of the restricting means, the valve element being adjustable to vary said ratio.

8. A fuel system as claimed in claim 7, wherein one of the restricting means is a fixed-area orifice and wherein the valve is a needle valve projecting into said orifice and adjustable with respect to the orifice to vary its effective area.

9. A fuel system as claimed in claim 8, wherein the needle valve element is adjusted in accordance with a speed condition and has an operative portion such that on increase of the speed condition the said ratio is first constant, then decreases and then increases.

10. A fuel system as claimed in claim 1, wherein one of said restricting means is in the form of a fixed-area orifice and wherein the adjustable means comprises a valve element in the form of a half ball co-operating with the orifice to restrict the flow therethrough and a lever carrying the half ball and rockable to adjust the position of the half ball relative to the orifice, whereby the ratio of the effective restrictions of the first and second restricting means is varied by rocking of said rockable lever.

11. A fuel system as claimed in claim 10 wherein said engine speed parameter-responsive means is responsive to compressor actual rotational speed connected to adjust said adjustable means in accordance with said actual rotational speed.

12. A fuel system as claimed in claim 10 wherein said engine speed parameter-responsive means is responsive to compressor corrected rotational speed connected to adjust said adjustable means in accordance with the corrected rotational speed.

13. A fuel system as claimed in claim 10 wherein said engine speed parameter-responsive means is responsive to compressor compression ratio connected to adjust said adjustable means in accordance with the compression ratio.

14. The combination with a fuel system for a gas-turbine engine comprising a fuel pump, fuel injectors connected to receive fuel from said fuel pump by conduit means including a pipeline arranged to convey the entire flow of fuel received by said fuel injectors, basic control means including fuel-flow selecting means to control the fuel flow to the injectors, and acceleration control means which comprise fuel-flow restricting means located in said pipeline and having a substantially linear fuel-flow/pressure-drop characteristic, means to adjust the fuel flow to the fuel injectors, first pressure-responsive means arranged to be subjected to a pressure derived from the delivery pressure of the compressor and connected to load said means to adjust the fuel flow to increase the fuel flow on increase of said delivery pressure, resilient means connected to load said means to adjust the fuel flow in a sense to augment the load due to said first pressure-responsive means and second pressure-responsive means arranged to be subjected to the difference in fuel pressures in said pipeline on each side of said fuel-flow restricting means, said second pressure-responsive means being connected to load said means to adjust the fuel-flow to reduce the fuel-flow on increase in the difference of fuel pressures, means to derive from the compressor delivery pressure the pressure to which said first pressure-responsive means is subjected, comprising a first conduit leading from the compressor delivery to a point of lower pressure associated with the compressor, first and second restricting means arranged in series in said conduit, a second conduit connected to a point in said first conduit between said first and second restricting means and connected to said first pressure-responsive means, whereby said first pressure-responsive means is loaded by the pressure in said first conduit between said first and second restricting means, adjustable means in said conduit to vary the flow of compressed air in said first conduit from the compressor delivery through said first and second restricting means to the point of lower pressure, whereby the ratio of the pressure between said first and second restricting means to the instantaneous compressor delivery pressure is variable, and engine speed-responsive means responsive to changes in engines rotational speed throughout the speed range thereof and connected to adjust said adjustable means in a sense to increase said ratio of the pressure between said first and second restricting means to the compressor delivery pressure as the engine accelerates from a lower to a higher speed at least in a range of speeds between a low speed range and a high speed range.

15. A fuel system as claimed in claim 1, wherein said engine speed parameter-responsive means is responsive to compressor actual rotational speed and is connected to adjust said adjustable means in accordance with said actual rotational speed.

16. A fuel system as claimed in claim 1, wherein said engine speed parameter-responsive means is responsive to compressor corrected rotational speed and is connected to adjust said adjustable means in accordance with the corrected rotational speed.

17. A fuel system as claimed in claim 1, wherein said engine speed parameter-responsive means is responsive to compressor compression ratio and is connected to adjust said adjustable means in accordance with the compression ratio.

18. A fuel system as claimed in claim 1, wherein said first and second restricting means are in the form of fixed-area orifices, and wherein the adjustable means comprises a valve located in said first conduit downstream of said first and second restricting means to control the outflow from the conduit, and wherein the engine speed responsive means is responsive to compressor actual rotational speed and is connected to adjust said adjustable means in accordance with said actual rotational speed.

19. A fuel system as claimed in claim 1, wherein first and second restricting means are in the form of fixed-area orifices, and wherein the adjustable means comprises a valve located in said first conduit downstream of said first and second restricting means to control the outflow from the conduit, and wherein the engine speed responsive means is responsive to compressor corrected rotational speed and is connected to adjust said adjustable means in accordance with the corrected rotational speed.

20. A fuel system as claimed in claim 1, wherein said first and second restricting means are in the form of fixed-area orifices, and wherein the adjustable means comprises a valve located in said first conduit downstream of said first and second restricting means to control the outflow from the conduit, and wherein the engine speed responsive means is responsive to compressor compression ratio and is connected to adjust said adjustable means in accordance with the compression ratio.

21. A fuel system as claimed in claim 1, wherein the adjustable means is such that the ratio of the effective restrictions of the first and second restricting means is varied by adjustment of said adjustable means, and wherein the engine speed responsive means is responsive to compressor actual rotational speed and is connected to adjust said adjustable means in accordance with said actual rotational speed.

22. A fuel system as claimed in claim 1, wherein the adjustable means is such that the ratio of the effective restrictions of the first and second restricting means is varied by adjustment of said adjustable means, and wherein the engine speed responsive means is responsive to compressor corrected rotational speed and is connected to adjust said adjustable means in accordance with the corrected rotational speed.

23. A fuel system as claimed in claim 1, wherein the adjustable means is such that the ratio of the effective restrictions of the first and second restricting means is varied by adjustment of said adjustable means, and wherein the engine speed responsive means is responsive to compressor compression ratio and is connected to adjust said adjustable means in accordance with the compression ratio.

References Cited in the file of this patent

UNITED STATES PATENTS

| Number | Name | Date |
|---|---|---|
| 1,902,340 | Schmidt | Mar. 21, 1933 |
| 2,613,029 | Wilde | Oct. 7, 1952 |
| 2,618,222 | Davies et al. | Nov. 18, 1952 |
| 2,642,718 | Pearl | June 24, 1953 |
| 2,643,514 | Jubb | June 30, 1953 |
| 2,645,240 | Drake | July 14, 1953 |
| 2,657,529 | Lawrence | Nov. 3, 1953 |
| 2,714,803 | Abild | Aug. 9, 1955 |
| 2,741,089 | Jagger | Apr. 10, 1956 |
| 2,746,242 | Reed | May 22, 1956 |
| 2,857,739 | Wright | Oct. 28, 1958 |